Aug. 4, 1931.　　　G. A. DEWBERY　　　1,817,241
HOOD CATCH FOR MOTOR VEHICLES
Filed Sept. 12, 1929
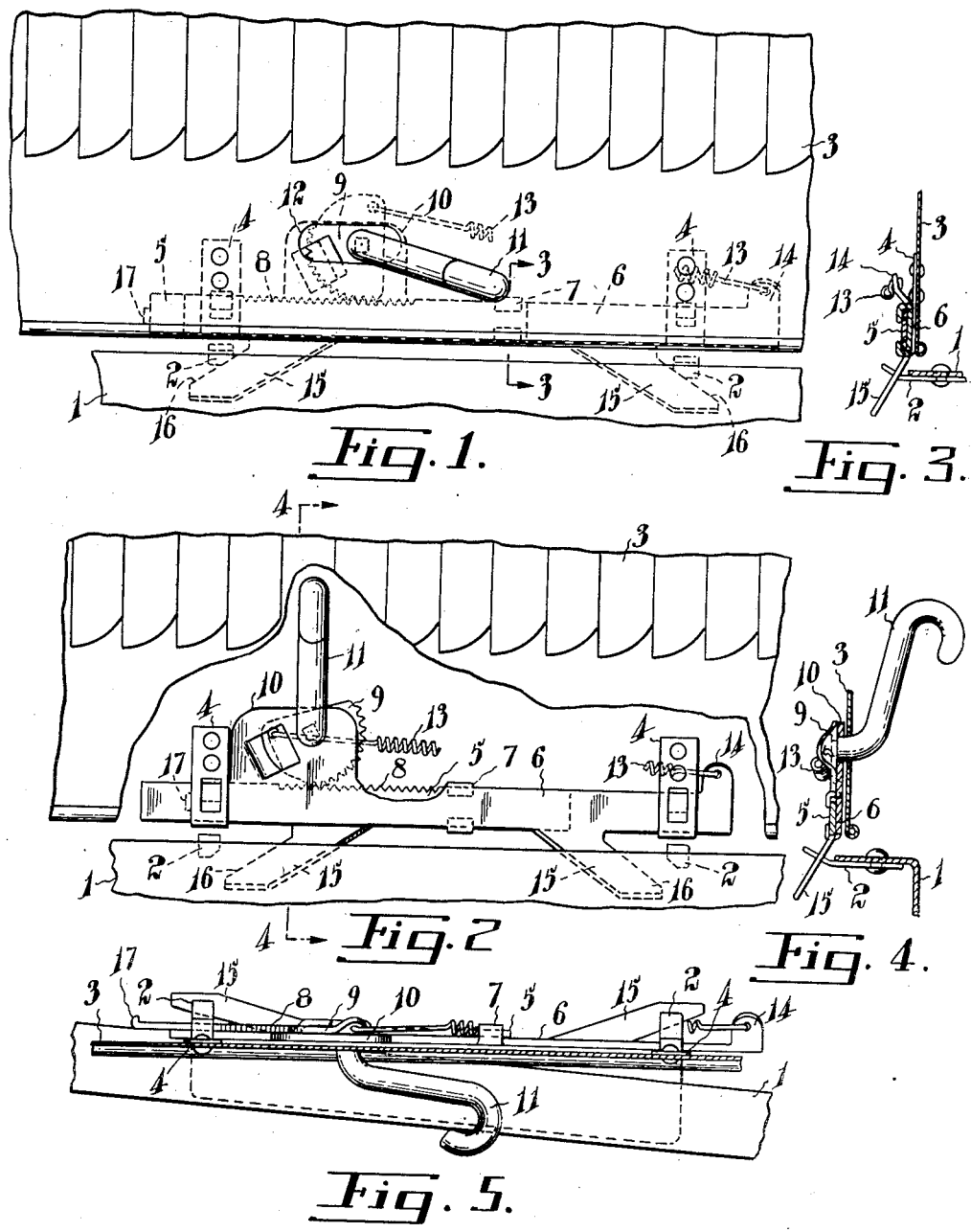
Inventor
G. A. Dewbery
by J. Edw. Maybee
ATTY.

Patented Aug. 4, 1931

1,817,241

UNITED STATES PATENT OFFICE

GEORGE ALBERT DEWBERY, OF OSHAWA, ONTARIO, CANADA

HOOD CATCH FOR MOTOR VEHICLES

Application filed September 12, 1929. Serial No. 392,162.

This invention relates to catches for the hoods of motor vehicles and other closures, and my object is to produce a satisfactory duplex catch operable by a single handle and which will firmly hold the hood with both a downward and an inward pressure against the parts which it engages.

I attain my object by means of a construction which may be briefly described as follows. Two latch members are slidably mounted on the hood shutter, each provided with a latch projection having a locking edge inclined relative to the direction of travel, such edges facing in opposite directions. The chassis is provided with keepers engageable by the inclined edges of the aforesaid projections, the keepers being positioned out of alinement with the latch members and the projections inclined to position them for engagement with the keepers. Spring means are provided tending to hold the projections in engagement with the keepers. To release the latch members a segmental gear is provided journalled on one latch member and meshing with a rack formed on the other latch member. A crank handle provides means whereby the segmental gear may be operated. A coil spring is connected at one end to the latch member carrying the segmental gear and at its other end to the segmental gear, the points of attachment being such that, when the crank handle is moved and the lock projections disengaged, the axis of the coil spring first coincides with and then passes the center on which the segmental gear is journalled, and the spring thus loses its power to move the latch members towards their keeper engaging position. The latch members are free to move as a unit in the direction of their length in their guides on the shutter.

The invention is hereinafter more specifically described, and is illustrated in the accompanying drawings in which Fig. 1 is a side elevation showing my improved catch applied to the hood of a motor vehicle, the parts being in locked position;

Fig. 2 is a similar view showing the parts in the unlocked position;

Fig. 3 is a cross section on the line 3—3 in Fig. 1;

Fig. 4 is a section on the line 4—4 in Fig. 2; and

Fig. 5 is a plan view.

In the drawings like numerals of reference indicate corresponding parts in the different figures.

1 is part of the chassis of a motor car to which are connected the keepers 2. 3 is the shutter of the hood of the vehicle which, it will be noted, is positioned outwardly relative to the keepers 2, which are therefore out of alinement with the lock, as hereinafter described.

On the shutter are mounted a pair of guides 4, preferably stamped up from sheet metal. In these guides the latch members 5 and 6 are adapted to slide. Preferably the latch member 6 engages in both guides, and the latch member 5 in the left hand member only, as shown in Fig. 1, the other end of the latch member 5 being guided by the lug 7 integral with the latch member 6 and turned up parallel and in spaced relationship thereto. The latch member 5 has a rack 8 formed thereon with which meshes a segmental gear 9 journalled on a lug 10 formed on the latch member 6. To this segmental gear is secured a crank handle 11 carried out through the slot 12 in the hood to the exterior thereof.

A coil spring 13 is connected at one end to a lug 14 on the latch member 6 and its other end to the segmental gear 9. These points of connection are so positioned that the axis of the spring will pass below the centre of oscillation of the segmental gear 9, thus neutralizing the effect of the spring tending to move the latch members to the position shown in Fig. 1 and enabling them to remain in the position shown in Fig. 2, with the crank handle upwardly extended.

The latch members 5 and 6 are provided with the locking projections 15, which are formed with the inclined surfaces 16, the inclination being in the direction of locking travel of the latch members. These projections are also inwardly inclined to engage the keepers 2 which are inwardly offset, as herein before described, relative to the shutter and latch.

When the parts are in the position shown in Fig. 1, the spring 13, through the medium of the segmental gear and rack, tends to force the inclined surfaces of the latching members against the keepers. Owing to the relative positions of the parts, this results in the shutter not only being drawn downwardly, but also inwardly, thus holding it tightly in engagement with the parts usually provided for this purpose. When it is desired to release the lock, it is merely necessary to throw the handle to the upright position shown in Fig. 2, thus disengaging the locking projections 15 which are retained in the unlocked position, as herein before described, until the handle is again operated, which, of course, will be after the shutter has been reclosed.

As the latch members are free to move longitudinally as a unit when retracted to the position shown in Fig. 2, it is necessary to provide stops to ensure them taking up a central position so that the projections 15 will both clear the keepers. For this purpose a stop 17 is formed on the end of the member 5 adapted to engage the adjacent guide 4, while the lug 10 forms a stop for the member 6. These stops ensure the movement of contraction being divided between the two members without interfering with their freedom to move independently or unitedly in engaging the keepers. This freedom to move as above results in an equalized holddown pressure by the two latch members.

From the above description it will be seen that I have devised a hood catch which will satisfactorily attain the objects of my invention as set out in the preamble to this specification. It is also evident that the invention may be varied in detail to a considerable extent without departing from the spirit of my invention as embodied in the appended claims.

What I claim as my invention is:

1. A duplex hood cap comprising a part on which the catch is mounted; two parallel latch members independently slidable relative to said part and one another; and manually operable means carried by and slidable with one member and engaging the other member whereby the said members may be moved to their unlatched position.

2. A duplex hood catch comprising a part on which the catch is mounted; two parallel latch members independently slidable relative to said part and one another; manually operable means carried by and slidable with one member and engaging the other member whereby the said members may be moved to their unlatched position; and a stop on each member limiting its unlatching movement relative to the part on which the catch is mounted.

3. A duplex hood catch comprising a part on which the catch is mounted; two parallel latch members slidable relative to said part and one another; manually operable means carried by and slidable with one member and engaging the other member whereby the said members may be moved to their unlatched position; and a spring connected at one end with said manually operated means and at its other end to the latching member on which said means are mounted and normally tending to actuate said means to hold the latching members in their latching position.

4. A duplex hood catch comprising a part on which the catch is mounted; two parallel latch members independently slidable relative to said part and one another; and a manually rockable member mounted on and slidable with one latch member and adapted to engage the other to effect its relative slidable movement.

5. A duplex hood catch comprising a part on which the catch is mounted; two parallel latch members slidable relative to said part and one another; a manually rockable member mounted on and slidable with one latch member adapted to engage the other to effect its relative slidable movement; and a spring engaging the said rockable member and the sliding latch member on which it is mounted normally tending to hold the latch members in their latching position 6. A duplex hood catch comprising a part on which the catch is mounted; two parallel latch members slidable relative to said part and one another; a gear rack formed on one member; a segmental gear journalled on the other member and meshing with the rack; and a crank handle secured to said segmental gear.

7. A duplex hood catch comprising a part on which the catch is mounted; two parallel latch members slidable relative to said part and one another; a gear rack formed on one member; a segmental gear journalled on the other member and meshing with the rack; a crank handle secured to said segmental gear; and a coil spring connected at one end of said gear and at its other end to the latch member on which it is mounted.

8. A duplex hood catch comprising a part on which the catch is mounted provided with two guides; latch members slidable in said guides; stops on said members adapted to engage the guides to limit the unlatching movement of the said members; a gear rack formed on one member; a segmental gear journalled on the other member and meshing with the rack; and a crank handle secured to said segmental gear.

9. A duplex hood catch comprising a part on which the catch is mounted provided with two guides; latch members slidable in said guides; stops on said members adapted to engage the guides to limit the unlatch-movement of the said members; a gear rack formed on one member; a segmental gear journalled on the other member and meshing with the rack; a crank handle secured to said segmental gear; and a coil spring connected at one end to said gear and at its other end to the latch member on which it is mounted.

10. In a hood catch the combination of two relatively displaceable parts; two latch members slidable on one of said parts; two keepers formed on the other of said parts; a latch projection on each latch member, said keepers and projections having a wedging engagement with each other inclined to the plane of movement of the latch members and inclined also in said plane whereby there is a transverse as well as longitudinal movement of said relatively displaceable parts relative to one another; and spring means tending to hold the projections and keepers in engagement.

11. A duplex hood catch comprising a part on which the catch is mounted; two parallel latch members independently slidable relative to said part and one another; spring actuated means carried solely by said members normally tending to move said members to their latching position; and manually operable means carried by and engaging said members for moving them to their unlatched position, the part on which the catch is mounted having a slot formed therein through which said manually operable means extends whereby the longitudinal movements of the latch members of the shutter are not interfered with by said means.

12. A duplex hood catch comprising a part on which the catch is mounted; two parallel latch members independently slidable relative to said part and one another; manually operable means carried by one member and engaging the other member whereby the said members may be moved to their unlatched position, the part on which the catch is mounted having a slot formed therein through which said manually operable means extends whereby the longitudinal movement of the latch members of the shutter are not interfered with by said means.

13. A duplex hood catch comprising a part on which the catch is mounted; two parallel latch members slidable relative to said part and one another; a manually rockable member mounted on and slidable with one latch member adapted to engage the other to effect its relative slidable movement; and a spring engaging the said rockable member and the sliding latch member on which it is mounted normally tending to hold the latch members in their latching position, the spring connections being so positioned that the line joining its point of attachment will pass and coincide with the center of oscillation of the rockable member when the latch members have been moved to their unlatched position thus rendering the spring inoperative to move said latch members.

14. A duplex hood catch comprising a part on which the catch is mounted; two parallel latch members slidable relative to said part and one another; a common guide on said part for one end of each of said latch members; a second guide on said part for the other end of one latch member and a guide on said last mentioned latch member for the other end of the other latch member; and manually operable means carried by and slidable with one member and engaging the other member whereby the said members may be moved to their unlatched position.

15. A duplex hood catch comprising a part on which the catch is mounted; two parallel latch members slidable relative to said part and one another; manually operable means carried by and slidable with one member and engaging the other member whereby the said members may be moved to their unlatched position; a crank handle secured to said means; and a spring connected at one end with said manually operated means and at its other end to the latching member on which said means are mounted and normally tending to actuate said means to hold the latching members in their latching position; said handle being arranged whereby the axis of the spring passes substantially through the axis of the crank handle when the latch members are in their unlatched position.

16. In a hood catch the combination of two relatively displaceable parts; two latch members independently slidable on one of said parts; two keepers formed on the other of said parts; and a latch projection on each latch member, said keepers and projections having a wedging engagement with each other inclined to the plane of movement of the latch members and inclined also in said plane whereby there is a transverse as well as longitudinal movement of said relatively displaceable parts relative to one another.

Signed at Oshawa this 3rd day of September, 1929.

GEORGE ALBERT DEWBERY.